United States Patent

[11] 3,632,258

[72] Inventor Hans Arthur Faerber
  Castle Cove, New South Wales, Australia
[21] Appl. No. 881,499
[22] Filed Dec. 2, 1969
[45] Patented Jan. 4, 1972
[73] Assignee NID Pty. Limited
  Alexandria, New South Wales, Australia
[32] Priority Dec. 2, 1968
[33] Australia
[31] 47,106/68

[54] CONFECTIONERY BAR EXTRUDING MACHINE
  14 Claims, 9 Drawing Figs.
[52] U.S. Cl.................................................. 425/223,
  425/89, 425/324, 425/365, 425/367, 425/377
[51] Int. Cl........................................................ A21c 11/04
[50] Field of Search............................................ 107/8 D, 8
  F, 8 FA, 9 D, 10, 12, 14 R, 15 AE, 15 AF; 18/9, 10, 12

[56] References Cited
UNITED STATES PATENTS
| | | | |
|---|---|---|---|
| 534,071 | 2/1895 | Mitchell | 107/14 R |
| 1,720,097 | 7/1929 | Scholz | 107/10 |
| 2,608,939 | 9/1952 | Naylor | 107/12 |
| 2,699,736 | 1/1955 | Sticelber | 107/12 |
| 2,951,456 | 9/1960 | Olgiati | 107/12 |

Primary Examiner—Price C. Faw, Jr.
Attorney—Stevens, Davis, Miller & Mosher

ABSTRACT: Apparatus for making a strip of dough having a roller with at least one circumferential groove and driving means to rotate the roller. The groove is preferably covered with a nonsticking material such as polytetrafluroethylene. A barrier makes sliding contact with the roll (except for a space between it and the floor of the groove) to define a pressure zone so as to fill the groove within the zone with dough. Stripping means removes the dough from the groove as a continuous strip, after it has been carried past the space between the groove bottom and the barrier.

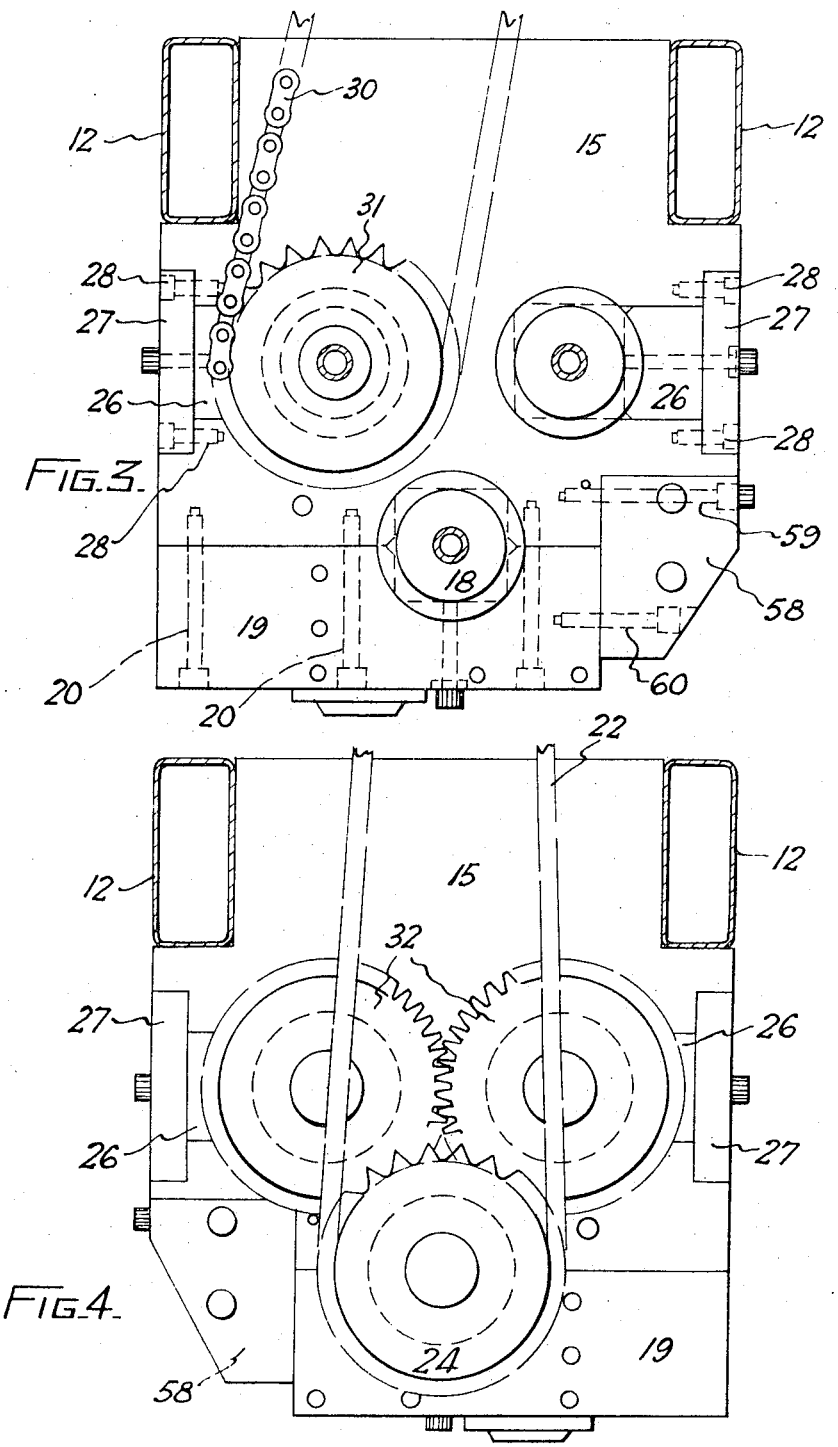

CONFECTIONERY BAR EXTRUDING MACHINE

This invention relates to the production of strips of Plastic material. The invention was devised primarily for the production of strips of confectionery material which are subsequently cut into short lengths to constitute items of confectionery or inner cores or components of more elaborate items of confectionery.

In view of the foregoing, the invention is described hereinafter primarily with reference to the production of strips of confectionery material, however, it is applicable to the formation of strips of plastic material irrespective of the purpose to which the material is to be put.

Thus, the term "plastic material" as used herein embraces any material which is readily molded under low pressure. Such materials include foodstuffs such as uncooked dough, creams and pastes, fudge, and similar viscous foodstuffs semisolids.

In the production of strips of confectionery material it is usual to extrude the material through an appropriately shaped orifice. So as to increase the rate of production most extrusion apparatus in common use provides for a plurality of orifices fed from a common supply duct or the like for the simultaneous production of a like plurality of strips. The extruded strips are normally processed simultaneously and, thus, it is necessary for the rates of extrusion from the orifices to be identical. Difficulty is experienced in obtaining equal extrusion rates because the frictional restraint on the flow of material to the extrusion orifices varies with the distance of material from the stationary walls of the container or duct through which it is fed to the orifices.

Furthermore, the pressure required in conventional extrusion processes is often damaging to confectionery materials producing unwanted physical changes in the consistency of the material as a whole or crushing nonplastic items such as fruits or nuts which may be embedded in it.

The present invention was devised to overcome the above-indicated deficiencies of prior known extrusion apparatus.

The invention consists in apparatus for producing a strip of plastic material, as defined herein, comprising a roller with a circumferential groove therein, drive means to rotate the roller, material barrier means making sliding contact with the roll except for a space between said barrier means and the floor of said groove and defining a pressure zone of the curved surface of the roller, feeder means to maintain a mass of the plastic material in pressure contact with said pressure zone thereby to fill the groove within said zone with plastic material, and stripping means able to remove plastic material from said groove, after it has been carried from said zone through said space, as a continuous strip.

Preferred embodiments of the above-described invention have the characteristics mentioned below.

The grooved roller has a plurality of grooves in it for the simultaneous production of a plurality of strips, and the feeder means, barrier means and stripping means are correspondingly adapted to operate on each groove simultaneously.

The grooved roller may be made from, or coated with, a material having good release characteristics, that is to say, a material to which other substances do not tend to adhere. Polytetrafluoroethylene is one suitable material.

The feeder means comprise a plurality of power driven feed rolls adapted frictionally to draw material from a hopper or the like and to pass it between them into contact with the grooved roller. Those feed rolls may be helically fluted, or otherwise conditioned to augment their frictional drag upon the material.

The material urged into contact with the grooved roller is restrained by barrier means in the nature of a pair of spaced doctor blades or the like, one of which enters the grooves of the grooved roller to prevent the escape of any material past it whereas the other enters the grooves either partly or not at all to permit material to be carried past it in the grooves of the grooved roller as it rotates.

For preference, each said barrier means is adjustably secured in position so that it may be brought into neat sliding contact with the surface of the roll with which it coacts to compensate for wear in the various components.

The barrier means which permits material to be carried past it may have a secondary rubbing surface which contacts the material in the roller groove shortly after it has left the pressure zone thereby to smooth out any inequalities in the exposed surface of the plastic material before it is stripped from the groove.

The stripping means whereby the material carried from the pressure zone is released from the roller grooves as a continuous strip may be in the nature of a support carrying a plurality of blades each adapted to prise the material from a roller groove or may comprise air nozzles positioned so as to direct jets of compressed air between the material and the floor of the groove.

Where the stripping means comprise a bladed support as aforesaid the support is preferably adjustable in position and each individual blade may itself be adjustable relative to the support thereby to ensure that each blade is correctly homed in the bottom of its roller groove. For preference, the blades are resilient or resiliently mounted on the bridge piece and may be provided with replaceable polytetrafluoroethylene or other tips.

In some instances especially if the material to be handles is relatively fluid, that portion of the grooved roller carrying material from the pressure zone is shrouded by shroud means confining the material in the groove and defining an outlet duct extending more or less tangentially from the groove (or from each groove, as the case may be). The threshold of said duct includes a sharp-edged lip which parts the material from the floor of the groove and conducts it into the duct for extrusion therethrough.

By way of example, an embodiment of the above-described invention is described hereinafter with reference to the accompanying drawings.

FIG. 3 is a sectional view taken on line 3—3 of FIG. 1 drawn to a larger scale.

FIG. 4 is a sectional view taken on line 4—4 of FIG. 1 drawn to the same scale as FIG. 3.

Figure 1:
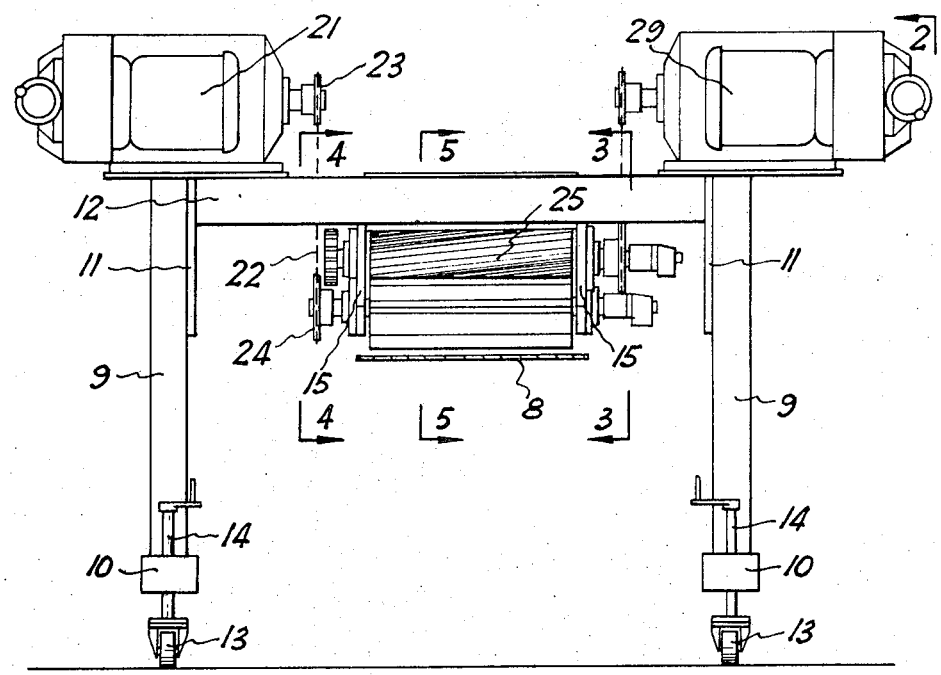
FIG. 1 is a front view of an apparatus according to the invention.
Figure 2:
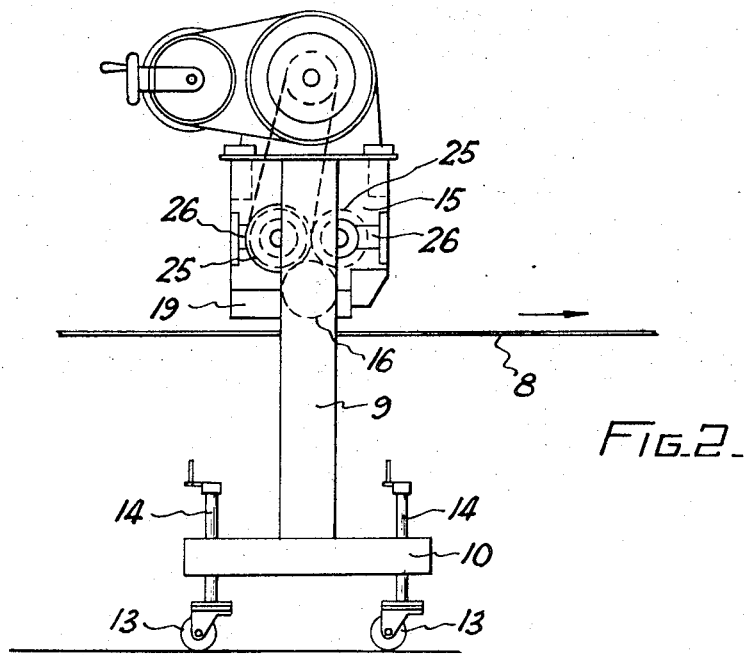
FIG. 2 is a side view of the apparatus of FIG. 1.

The apparatus illustrated by FIGS. 1 to 7 is adapted to form a plurality of strips of plastic material and to deposit same upon an input conveyor or the like of a machine adapted to carry out further manufacturing operations on the strips.

In the drawings such an input conveyor is indicated by a fragment of the upper flight of an endless belt 8 but it will be appreciated that the nature of the conveyor, table or the like on to which the strips are extruded does not constitute a part of the present invention.

The apparatus includes a supporting frame comprising two legs 9, feet 10, gusset plates 11, main beams 12 and caster wheels 13. Each caster wheel 13 is mounted on the bottom end of a threaded stem 14 extending through a foot 10 to enable the apparatus to be raised and lowered, as needed, to suit the height of the upper flight of the belt 8.

Two relatively thick cheek plates 15 extend downwardly from the main beams 12 and a grooved roller 16 with a plurality of spaced apart circumferential grooves 17 in it extends from one cheek plate 15 to the other.

The grove roller 16 is journaled at each end in conventional bearings 18. Each bearing 18 is located partly within a recess in the bottom edge of its associated cheek plate 15 and partly within a corresponding recess in the upper edge of a first apron plate 19, of which there are two respectively associated with the cheek plate 15. Each apron plate 19 is securable in edge-to-edge abutment with its associated check plate by means of a plurality of fastening screws 20. Thus, by removing the apron plates 19 the grooved roller 16 may be lowered and replaced by another such roller whenever the product requires a change in the number and/or dimensions of the grooves.

The grooved roller 16 is preferably made from, or coated with, polytetrafluoroethylene.

When the apparatus is in use the grooved roller 16 is caused to rotate by drive means comprising a conventional electric motor and variable ratio gearbox unit 21 with its output shaft drive connected to the roller 16 by means of an endless transmission chain 22 riding about a driving sprocket 23 on said output shaft and a driven sprocket 24 on the supporting shaft of the roller 16.

Two helically fluted feed rolls 25 are mounted side-by-side above the grooved roller 16. The feed rolls 25 extend from one cheek plate 15 to the other and are mounted in bearings located in recesses in the side edges of the cheek plates. The feed roll bearings are held in place by spacers 26 and keepers 27 which are themselves held by fastening screws 28.

One of the feed rolls 25 is rotated by a second motor and variable gearbox unit 29 connected by way of a power transmission chain 30 to a driven sprocket 31 on said one feed roll support shaft and the other feed roll 25 is driven from the first mentioned feed roll by means of mating gears 32 on the feed roll supporting shafts.

The feed rolls 25 are disposed below a pair of hopper sideplates 33 extending from one cheek plate 15 to the other and in conjunction therewith adapted to contain a mass of plastic material between them. If desired, a preferably removably partition plate 34 may be provided to divide the mass of plastic material into two separate masses 35 and 36 respectively when it is desired that the finished strip comprise two layers of differing plastic material disposed one upon the other.

When the feed rolls 25 are caused to rotate they drag the plastic material 35 and 36 downwardly and feed it into pressure contact with the curved surface of the grooved roller 16.

The zone of the surface of the roller 16 against which the plastic material impinges is defined by barrier means 37 and 38 respectively.

The barrier means 37 comprises a doctor blade 39 adapted to rub against the surface of one of the feed rolls 25 and against the surface of the grooved roller 16 intermediate the groove therein and is provided on its underside with a plurality of filler blocks 40 each adapted to enter and neatly fill an associated groove 17.

The doctor blade 39 is located at its ends in mounting slots 41 in the cheek plates 15 and is kept in place by removable retainer pins 42 each extending through a respective cheek plate 15 into the space between a stiffening edge flange 43 and an abutment lug 44 on the doctor blade 39. Thus, it will be seen that the barrier means 41 effectively prevent the escape of any plastic material from between the grooved roller 16 and the feed roller 25 with which the barrier means 41 is associated.

The barrier means 38 comprise a mounting bar 45 extending from one cheek plate 15 to the other, a doctor blade 46 adapted to rub against the curved surface of the other feed roll 25 and a rubbing strip 47 having an arcuate edge face adapted to bear against a narrow longitudinal zone of the curved surface of the grooved roller 16 intermediate the grooves therein. For preference, the doctor blade 46 and rubbing strip 47 are secured together and may be advanced into the space between the groove roll 16 and the adjacent feed roll 25 by means of a plurality of adjustment screws 48 extending through the mounting bar 45 into contact with the rubbing strip 47.

Thus, it will be seen that the barrier means 38 do not enter the grooves 17 and, thus, plastic material forced into those grooves by the operation of the feed rolls 25 is carried in those grooves from the zone of the grooved roller defined by the barrier means 37 and 38 through the space between the rubbing strip 47 and the floors of the grooves 17.

Figure 5:
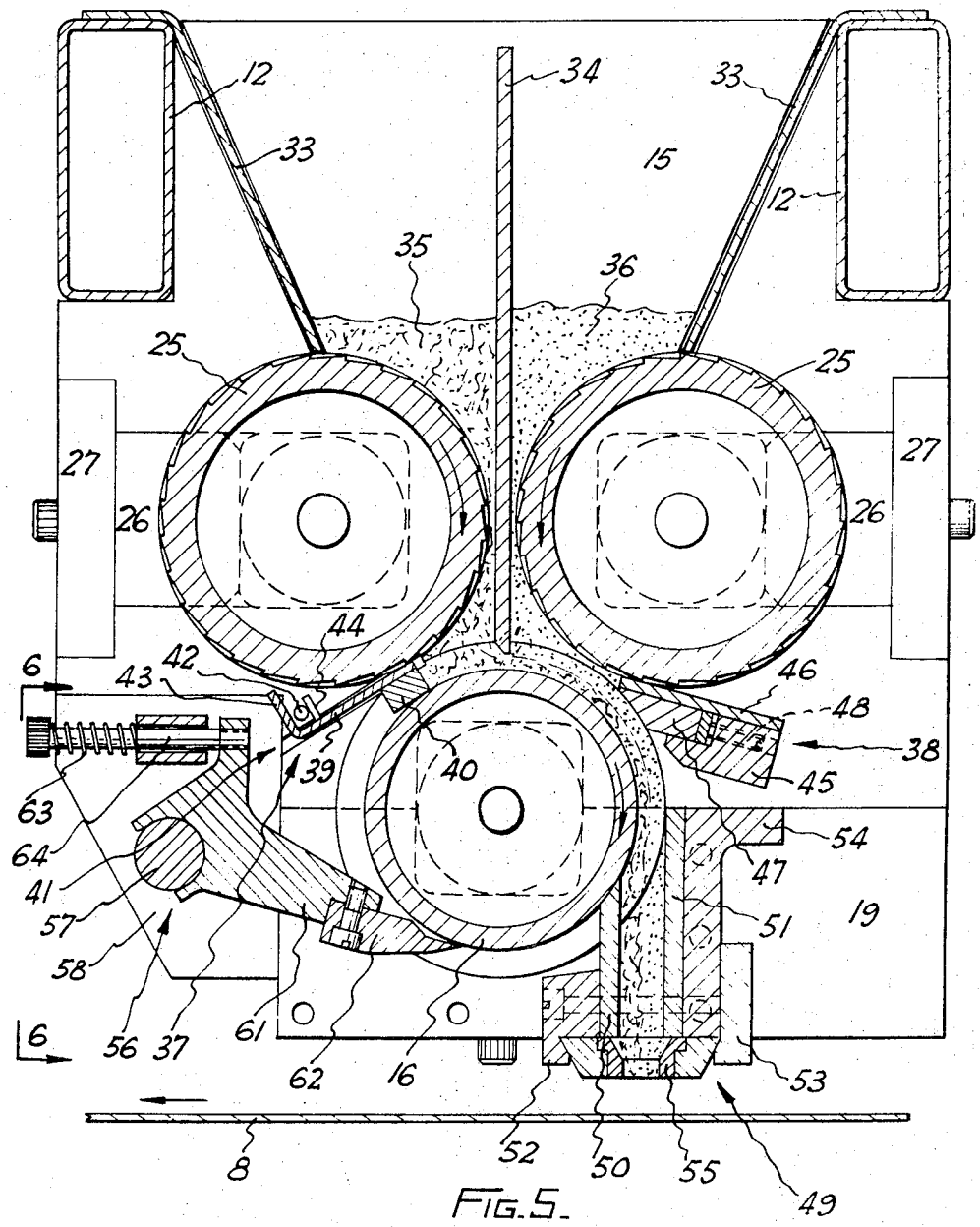
FIG. 5 is a sectional view taken on line 5—5 of FIG. 1 drawn to a still larger scale and showing two forms of replaceable stripping means.
Figure 6:
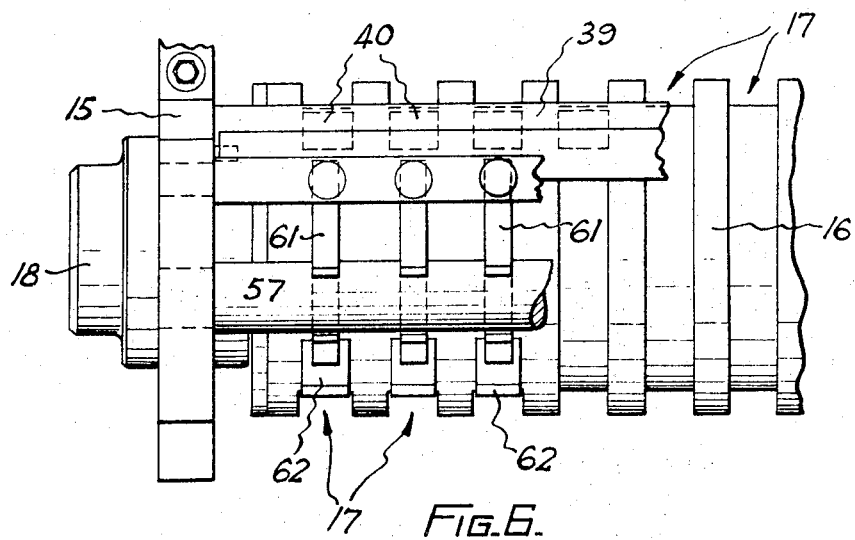
FIG. 6 is a view taken on line 6—6 of FIG. 5.
Figure 7:
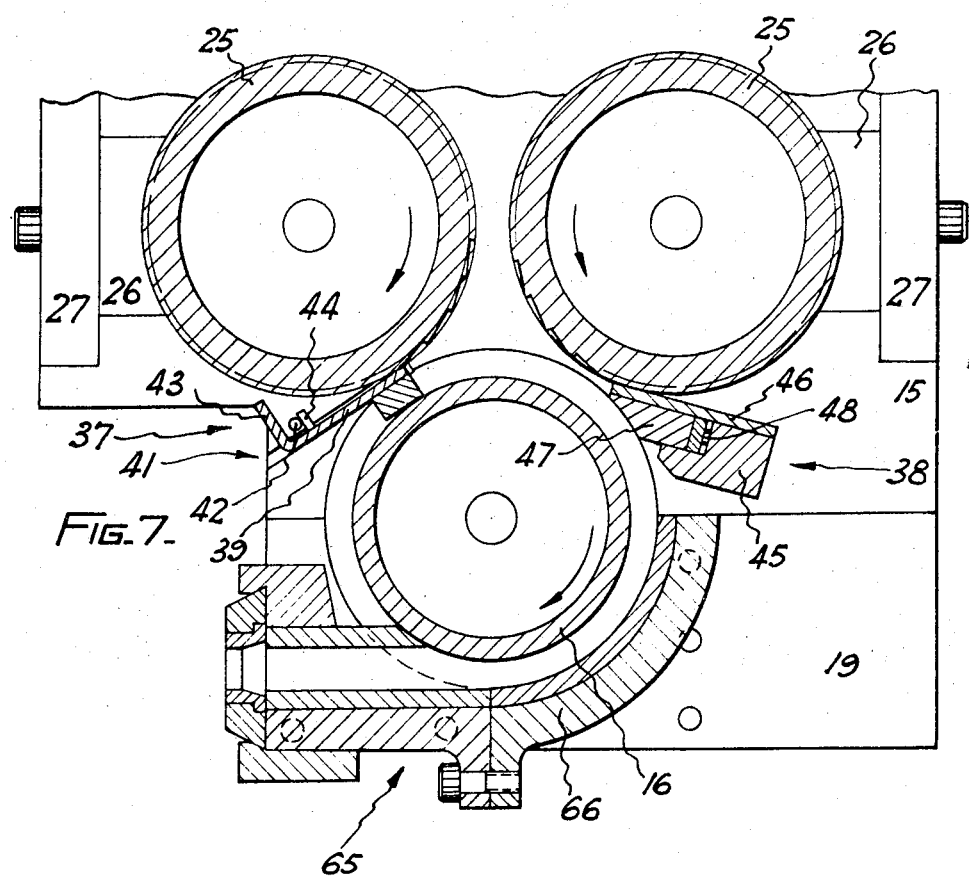
FIG. 7 is a view similar to FIG. 5 showing another from of replaceable stripping means.

The plastic material in the groove 17 may be removed therefrom by stripping means 49 (FIG. 5).

The stripping means 49 comprise a stripping bar 50 having a plurality of chisel-edged stripping blades on its upper edge each adapted to enter a corresponding groove 17, a manifold element 51 and supporting pieces 52, 53 and 54 extending from one apron plate 19 to the other.

The manifold element 51 has a plurality of ribs on it extending to the stripping bar 50 and, thus, these two components define a plurality of passageways through which the plastic material prised from the grooves 17 by the stripping blades is extruded.

The cross-sectional shape of the strip emerging from each said passageway may be determined by a nozzle strip 55 with a plurality of nozzle opening piercing it respectively in alignment with the passageways.

If desired, the stripping means 49 may be removed and in their place stripping means 56 may be utilized.

The stripping means 56 comprise a fulcrum shaft 57 extending from one to the other of a pair of second apron plates 58 detachably secured by fastening screws 59 and 60.

A plurality of bellcrank levers 61 are mounted upon the fulcrum shaft 57 and each carries a replaceable stripping blade 62 adapted to enter a groove 17 to prise the plastic material therefrom and to cause it to flow downwardly on to the conveyor belt 18.

For preference, the stripping blades 62 are kept in rubbing contact with the floors of the grooves 17 by virtue of a plurality of loading springs 63 acting upon headed pull-rods 64 projecting respectively from the bellcrank levers 61.

If desired, both the stripping means 49 and 56 may be removed in favor of stripping means 65 (FIG. 6) which comprise a horizontally extending stripping means essentially the same as stripping means 49 in combination with an arcuate shroud 66.

It will be appreciated that the stripping means 49 and 65 are used when the plastic material is relatively fluid (depending upon whether vertical or horizontal discharge of the strip is required) and stripping means 56 may be used when the plastic material is relatively stiff or self-cohesive.

Figure 8:
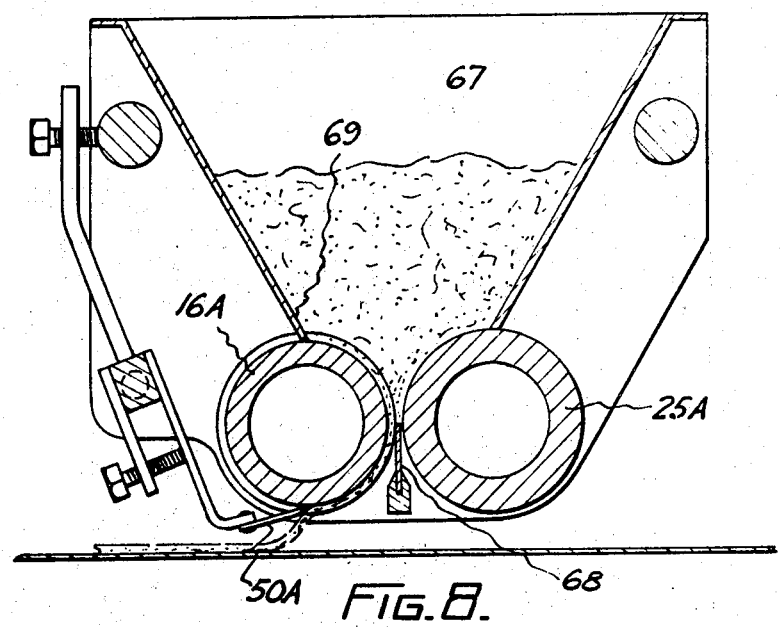
FIG. 8 is a diagrammatic view similar to FIG. 5 of another apparatus according to the invention.

FIG. 8 illustrates a simpler form of the invention wherein a single grooved roller 16A coacts with a single feed roll 25A to draw the plastic material from a hopper 67 and carry it to a stripping blade 50A.

Figure 9:
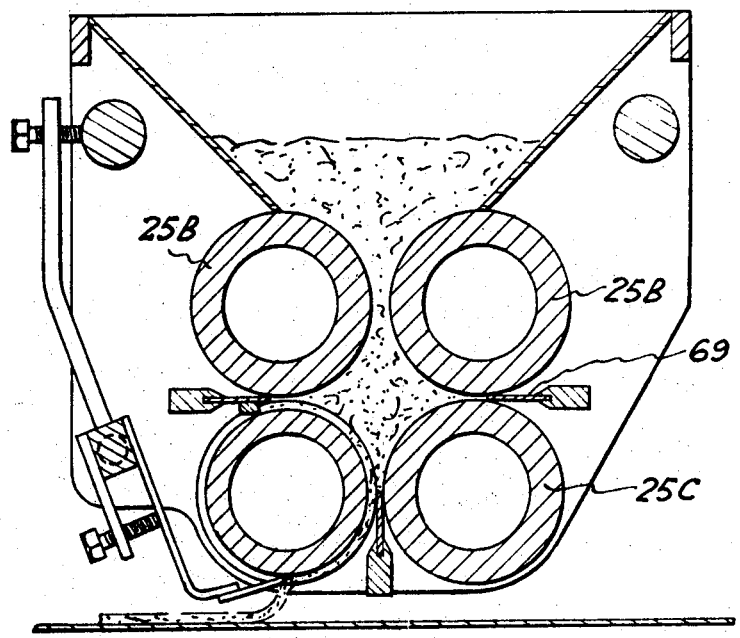
FIG. 9 is a view similar to FIG. 8 of still another apparatus according to the invention.

In this example of the invention the barrier means comprise a doctor blade 68 and an edge margin of the hopper wall 69 adapted to function as a doctor blade which enters the grooves in the roll 16A. The apparatus of FIG. 9 is similar to that of FIG. 8 except for the provision of feed rolls 25B which augment the action of feed roll 25C (corresponding directly to feed roll 15A).

In the last mentioned example of the invention the feeder means also comprise an interroll barrier 69.

In all embodiments of the invention the fact that the grooved roll transports the material from the pressure zone means that the initial pressure applied to the material has only to be sufficient to cause it to flow into the grooves of the grooved roll and any feed means adapted to create such pressure may be used instead of the various arrangements of feed rolls described above.

In some instances, gravity will be sufficient to cause the material to flow into the roll grooves and, thus, according to another very simple embodiment of the invention the grooved roll is mounted directly below the outlet of a hopper so as to make sliding contact with the rim of that outlet. That is to say, the outlet rim constitutes the barrier devices defining the pressure zone. If the weight of material in the hopper is insufficient to cause it to fill the roll grooves the hopper may be pressurized or the material in it loaded downwardly by any conventional means.

We claim:

1. Apparatus for producing a strip of plastic material, as defined herein, comprising a roller with a circumferential groove therein, drive means to rotate the roller, material barrier means making sliding contact with the roll, except for a space between said barrier means and the floor of said groove, and defining a pressure zone of the curved surface of the roller, feeder means to maintain a mass of the plastic material in pressure contact with said pressure zone thereby to fill the groove within said zone with plastic material, and stripping means able to remove plastic material from said groove, after it has been carried from said zone through said space, as a continuous strip.

2. Apparatus according to claim 1 wherein said grooved roller has a plurality of grooves in it and wherein said feeder means, material barrier means and stripping means operate in relation to each groove simultaneously.

3. Apparatus according to claim 1 wherein said grooved roller is made of a substance to which said plastic material tends not to adhere.

4. Apparatus according to claim 3 wherein said substance is polytetrafluoroethylene.

5. Apparatus according to claim 1 wherein said feeder means comprise a hopper for the temporary storage of a quantity of said plastic material, a feed roll adapted when rotating to drag said plastic material from said hopper and urge it towards said pressure zone, and feed roll driving means to rotate said feed roll.

6. Apparatus according to claim 5 wherein said feed roll, is helically fluted.

7. Apparatus according to claim 1 wherein said feeder means comprise a hopper for the temporary storage of a quantity of said plastic material, at least two feed rolls adapted when rotating in opposite directions to drag said plastic material from said hopper between them and urge it towards said pressure zone, and feed roll driving means to rotate said feed rolls in opposite directions.

8. Apparatus according to claim 1 wherein said material barrier means comprise a pair of spaced doctor blades, one of which enters the groove, of the grooved roller to prevent the escape of any plastic material past it and the other of which enters the groove to a point spaced from the floor of the groove.

9. Apparatus according to claim 1 wherein said barrier means are adjustable in position.

10. Apparatus according to claim 1 wherein said material barrier means include a secondary rubbing surface adapted to bear against the exposed surface of the plastic material as it emerges through said space.

11. Apparatus according to claim 1 wherein said stripping means comprise a blade associated with said groove, adapted to prise the plastic material from the groove.

12. Apparatus according to claim 11 wherein said blade, is provided with a replaceable tip.

13. Apparatus according to claim 12 wherein said replaceable tip is composed of polytetrafluoroethylene.

14. Apparatus according to claim 11 wherein said stripping means further comprise a manifold element which together with said blade defines an outlet duct extending substantially tangentially from the groove.

* * * * *